Dec. 29, 1964 KO KUMAGAI ET AL 3,163,715

PHASE CONTROL SYSTEM

Filed Feb. 15, 1961 3 Sheets-Sheet 3

3,163,715

PHASE CONTROL SYSTEM

Ko Kumagai, Kitatama-gun, and Hiroichi Teramura, Ota-ku, Tokyo-to, Japan, assignors to Kokusai Denshin Denwa Kabushiki Kaisha, Tokyo-to, Japan, a joint-stock company of Japan Filed Feb. 15, 1961, Ser. No. 89,462
Claims priority application Japan, Feb. 22, 1960, 35/5,235
3 Claims. (Cl. 178—23)

This invention relates to a phase correcting system for synchronous telegraphy.

It is an object of this invention to provide a novel phase correcting system for adjusting the phase between two cooperating telegraph stations and which is capable of reducing, to an extreme degree, misoperation of the dephase detector due to noise and, at the same time, in the case of actual dephase, of shortening the detection time relative to known apparatus.

It is another object of this invention to provide a system as stated above wherein the disadvantages commonly accompanying the conventional systems of similar type, as will be described hereafter, are eliminated or greatly reduced.

As is commonly understood in the art, an automatic error correcting system by repetition (ARQ system) of a telegraphic circuit is a system wherein a code in which the ratio of the number of elements of the marks and spaces within one character is made constant (for example: a 3-mark, 4-space code) is used as the telegraphic signal, and when a mutilation (element error) occurs in the transmission line, since the proper mark space ratio is destroyed, the error (character error) can be detected, the communication of the reversed-direction circuit is immediately placed in a state of standing by, and an RQ signal (signal indicating repetition) is sent to the other party, thereby causing the other party to repeat until correct signal reception is obtained.

In this type of system, it is necessary that the phase of the character sent out from the other party's station and that of the character timing pulse of the receiving apparatus of the receiving party's station be truly coincident. Furthermore, because an ARQ system is ordinarily used cojointly with a time division multiplex system, the number of phase combinations between transmitting and receiving is equal to the product of the number of elements composing one character and the number of multiplex channels. If the phases are not correctly coincident, communication may become impossible, or the channels may be received in an interchanged state, thereby becoming incapable of maintaining secrecy of communication.

The above-mentioned objects of this invention have been attained and the above-mentioned disadvantages of the prior art have been eliminated by a phase correcting system provided with first means for detecting the erroneous characters of examining the mark-to-phase ratio during each character period of a received signal, second means for detecting the existence of error detected by the first means in a fixed period which is equal to an integral multiple of the repetition cycle of the synchronous telegraph system, third means for detecting whether or not the number of mark or space element pulses of the received signal during said fixed period corresponds to a predetermined number, fourth means for detecting whether or not the phase of signals corresponding to the received characters are in-phase or out-of-phase with the character timing pulses, fifth means for shifting the phase of the character timing pulses by accepting the output of the fourth means until the phase of the character timing pulses is brought in-phase with the phase of the signals corresponding to the received characters, all of said means being combined so that the detecting operation by the fourth means can be carried out only when the second means has detected the existence of error during the said fixed period and the third means has detected that the number of mark or space element pulses is equal to said predetermined number.

The manner in which the foregoing objects, other objects, and advantages of the invention may best be achieved and the details of the invention will be best understood from a consideration of the following description, taken in conjunction with the accompanying illustrations in which the same and equivalent parts are designated by the same reference numerals and letters and in which.

Figure 1:
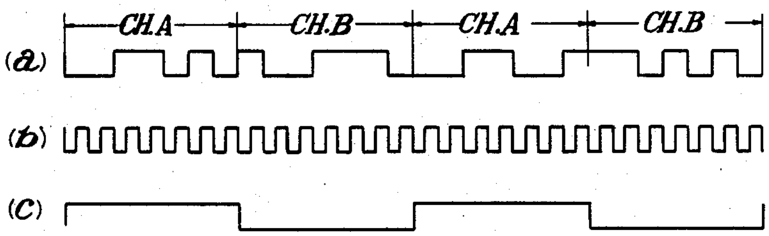
FIG. 1 is a time diagram indicating the time relationship between synchronous-type telegraphic signals and the processes of the receiving apparatus.

Referring to FIG. 1, the time diagram indicates the timing of selection of an aggregate signal in a two channel duplex system wherein a 7-unit protection code with a mark space ratio of 3 to 4 is used. FIG. 1(*a*) represents the received signal, the signal of the two channel duplex system of channel A (CH. A) being of normal keying, and the signal of channel B (CH. B) being of reverse keying. FIG. 1(*b*) represents a timing pulse which samples the abovementioned signal, and its timing with the said signal is maintained by automatic frequency control. The said signal is sampled by the positive transition of the said pulse. FIG. 1(*c*) represents a channel pulse for distributing the two channels A and B obtained by frequency division through the use of the negative transition of (*b*) and has the period of a character. The upper side of this wave form is used for the selection of CH. A, and the lower side is used for the selection of CH. B. A phase relationship as shown in FIG. 1 between (*a*) and (*c*) must be maintained, but, as can be understood from the drawing, (*c*) has $7\times2=14$ phase relationships, and if the phase is any other than that illustrated, the signal cannot be received correctly. Accordingly, in the conventional ARQ apparatus, in general, a phase controller which includes a dephase detector for the purpose of exactly correcting the phase is provided.

Figure 2:
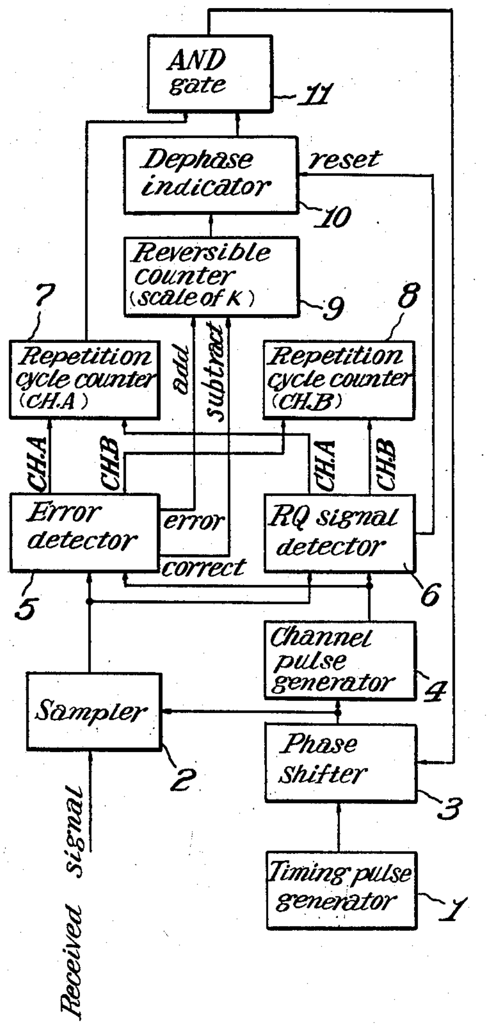
FIG. 2 is a block diagram indicating one example of a conventional phase control system.

One example of the conventional phase controller of this type is indicated in FIG. 2. The received signal (FIG. 1(*a*)) undergoes sampling in a sampler 2, with the use of pulses (FIG. 1(*b*)) which have been generated in a timing pulse generator 1 and passed through a phase shifter 3, and is imparted to an error detector 5 and an RQ signal detector 6. The error detector 5 detects whether or not the seven elements taken as one character have the predetermined mark-to-space ratio, and it is controlled for reading out a detected condition thereof and resetting by pulses (FIG. 1(*c*)) from a channel pulse generator 4 which generates character timing pulses (FIG. 1(*c*)) by dividing the pulses (FIG. 1(*b*)) from the timing pulse generator 1. When the seven code elements do not have the predetermined mark-to-space ratio, the error detector 5 detects them as erroneous characters and produces output pulses indicating "error" whereby the count of a reversible counter (scale of *k*) 9 of the succeeding stage is increased progressively; and when the seven code elements have the predetermined mark-to-space ratio, the detector 5 judges them as correct characters and generates output pulses indicating "correct" whereby the count of the counter 9 is reduced in turn. Thus the count of the reversible counter 9 indicates the difference between the number of erroneous characters and the number of correct characters.

If many errors are detected and the count of the counter 9 exceeds the full scale of $k$, the counter 9 generates an output, which actuates a phase indicator 10 and is imparted to an AND gate of the succeeding stage.

In an ARQ system, the "RQ signal" is employed as a signal for requesting the other party to retransmit the correct character when the received character is detected as an erroneous character and moreover as a signal preceding to the retransmitting characters in the other party in order to represent "repetition."

On another hand, a repetition cycle counter (CH. A) 7 generates a pulse 9 to initiate a repetition cycle (ordinarily, a 4-character cycle) when an error in its own channel is detected by the error detector 5. When a repetition cycle pulse is generated during the activation state of the dephase indicator 10, the AND gate 11 sends out a pulse which is imparted to the phase shifter 3 and shifts the phase of the timing pulse by one sampling cycle, thereby shifting the phase of output signal (channel pulse) of the channel pulse generator 4. When RQ signals are correctly detected by the RQ signal detector 6 in both channels, it is judged that the correct phase condition has been attained, and then the dephase indicator is reset and stops the phase shifting.

That is, in the conventional phase correcting system, the dephase condition is judged by examining whether or not the number of detected error characters if over the number of detected correct characters.

When the condition is judged as "dephase," phase shifting is carried out until the RQ signals are received correctly, because in this case the RQ signals are repeatedly sent from the other party. When the RQ signals are received correctly, the condition is judged as "in phase" and the phase shifting is stopped. Accordingly, in a system of this kind, if an attempt is made to shorten the time for detecting dephase, it is necessary to reduce the scale (or time constant) of the reversible counter 9 (or integrator). However, if noise (including a line break) exists in the transmission line, many errors are received. Consequently, there is a high probability of misjudgement wherein the condition is judged as "dephase" even though the phase of transmitting side and receiving side are coincident, thereby shifting erroneously the phase of receiving side maintained correctly. Especially, since this kind of misoperation seriously reduces the time of understandable communication and increases the error rate of communication texts, its prevention has to be warranted.

Furthermore, in a system wherein the inphase condition is judged by the reception of RQ signals, there is a possibility of misjudgement wherein a character different from the RQ signal is detected as RQ signal during phase shifting. This erroneous detection is caused by combinations of characters transmitted from the other party. In this case, there is the possibility that, in spite of the existence of a dephase condition, the condition is judged as "in phase," whereby characters transmitted from the other party are received erroneously.

In view of the above-described points, the phase carrying system of the present invention has been designed to eliminate, almost completely, misoperation of the dephase detector due to noise and, in an actual case of dephase, to shorten the time of detection thereof. Moreover, it has been designed to eliminate any judgment of inphase in spite of an out-of-phase condition still existing during phase shifting.

Figures 3, 5:
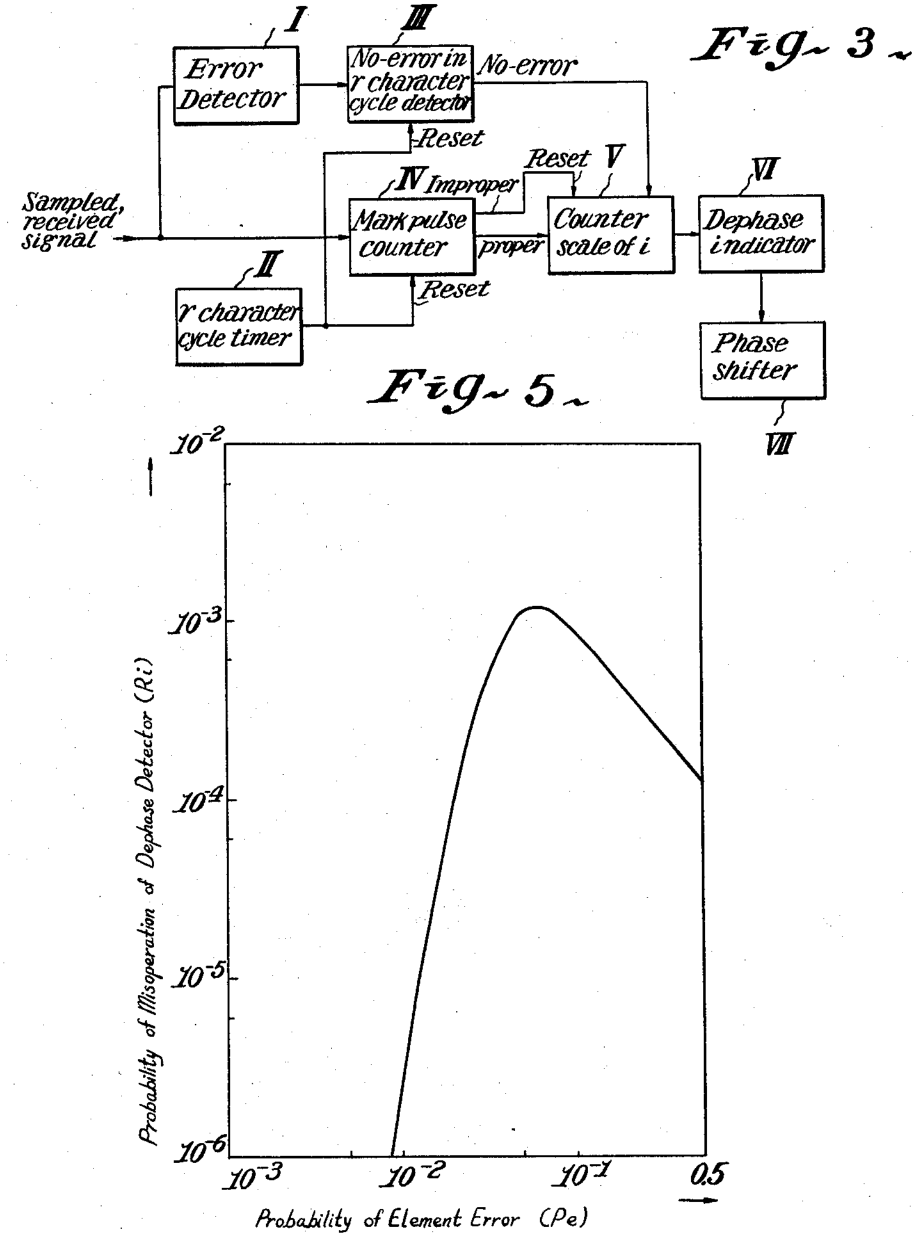
FIG. 3 is a block diagram indicating the principle of the present invention.
FIG. 5 is a graphical representation, on logarithmic scales, indicating the probability of misoperation, due to noise, of a dephase detector of the present invention.

The principle of the present invention is indicated in the block diagram of FIG. 3, wherein the sampled receiving signal is inspected in an error detector I to determine whether or not the mark-to-space ratio of each character is being maintained at the predetermined value. An $r$ character cycle timer II is constantly generating one pulse for each $r$ character cycle which has the same period as the repetition cycle or an integral multiple thereof and, at each instance of pulse generation, resets a "no-error in $r$ character cycle" detector III and a mark pulse counter IV. The detector III causes a counter (scale of $i$) V to reset if there is no error in the mark-to-space ratio during the $r$ character cycle, but it does not reset the counter V if there is an error in the $r$ character cycle. With respect to the mark pulse counter IV, when the number of mark element pulses during the $r$ characters is in the predetermined number, a "proper" output is produced whereby the count of the counter V advances progressively; and when the number of mark element pulses during the $r$ characters is not the predetermined number, an "improper" output is produced whereby the counter V is reset. When the count of the above-mentioned counter V reaches the full scale of $i$, the counter generates an output which activates a dephase indicator VI of the succeeding stage. A phase shifter II is controlled by the output signal of the dephase indicator VI. In this case, the dephase indicator VI and the phase shifter VII are respectively identical to the dephase indicator 19 and the phase shifter 3 in FIG. 2.

In an ARQ system, when a dephase condition occurs, repetition of the $r$ character comprising the RQ signal and another information characters (for example, characters representative of "A," "B" and "C"), is, generally continued. Therefore, if the number of mark or space element pulses are counted during the duration of the $r$ character cycle starting from any optional signal element, it will always correspond to the predetermined number as long as there is no error, because of the constant combination of the repetition characters. The above above-mentioned condition corresponding to the predetermined number exists still in the case of dephase for the same reason.

In the present invention, the phase correcting system is so adapted that: the received signal is inspected by the error detector I to detect whether or not each character has the appropriate mark-to-space ratio, then by the detector III, is detected whether or not errors detected by the error detector I exists in each character cycle of a period which is equal to the period (or an integral multiple thereof) of the repetition cycle; at the same time, whether or not the number of mark element pulses corresponds to the predetermined number is detected by the mark pulse counter IV; the count of the counter V advances progressively only when an error exists within $r$ characters and moreover the number of mark element pulses during this $r$ character cycle corresponds to the predetermined number; and phase shifting is carried out only when this condition has continued through $i$ cycle, whereby the count of the counter V has reached the full scale $i$.

However, since it is extremely rare that, in the case there are errors due to noise and the number of mark or space element pulses in the $r$ character cycle corresponds to the predetermined number, the probability of erroneous judgment wherein erroneous detection due to noise is judged as "dephase" becomes extremely low in the case of the present invention. Accordingly, it is possible to shorten the necessary time for detecting actual dephase by reducing the count ($i$) of the counter V.

Figure 4:
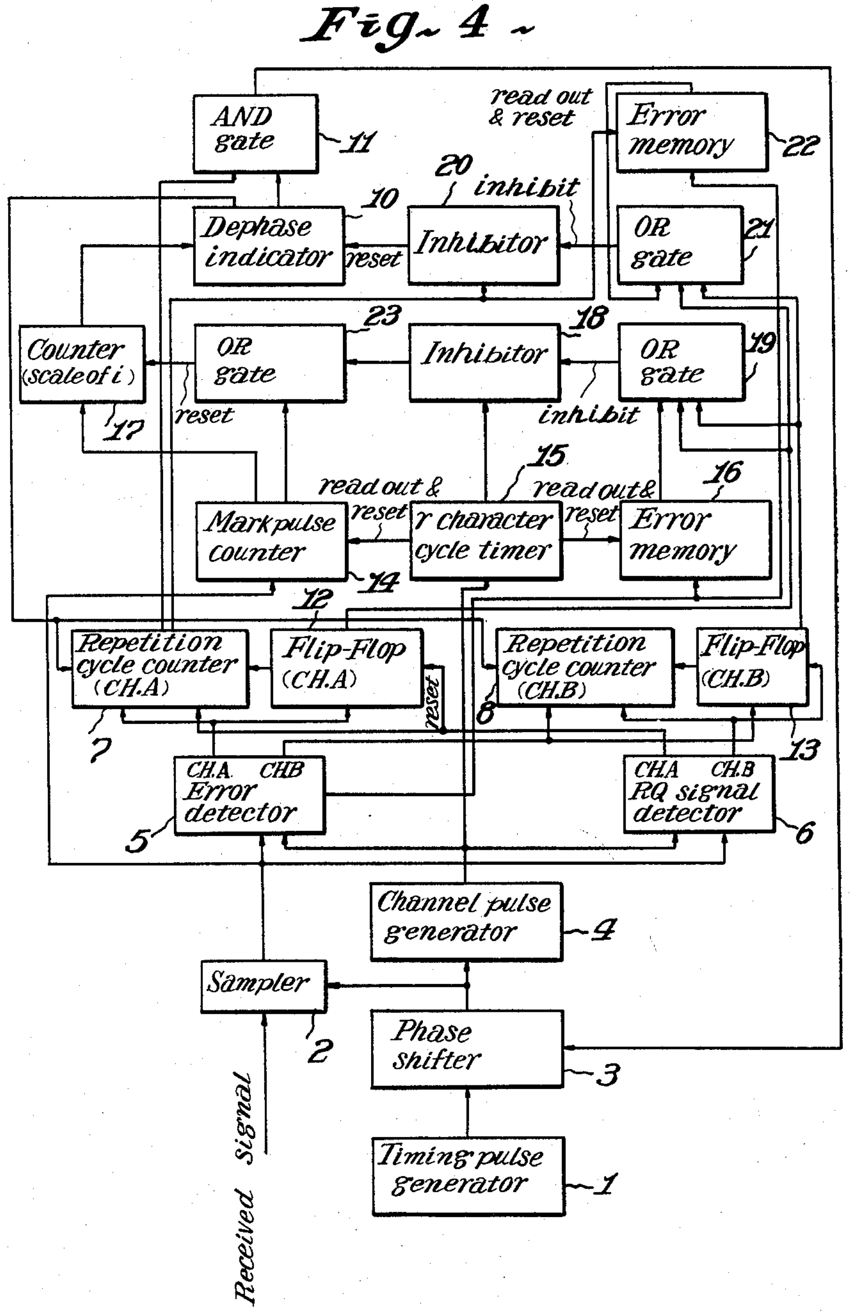
FIG. 4 is a block diagram indicating an embodiment wherein the principle of the present invention is utilized.

To facilitate a clearer understanding of the present system, its operation is described below in detail relative to the embodiment illustrated in FIG. 4, in which the above-described principle is utilized.

The pulses (FIG. 1($b$)) generated by a timing pulse generator 1 pass through a phase shifter 3 and are impressed respectively on a sampler 2 and a channel pulse generator 4. The output of the sampler 2 is imparted to an error detector 5 and a RQ signal detector 6 respectively, wherein detection of an error or RQ signal is detected with the aid of the timing of the pulses (FIG. 1(*c*)) from the channel pulse generator 4. A repetition cycle counter 7 for CH. A and a repetition cycle counter 8 for CH. B begin the count for repetition cycle when an error or RQ signal is detected in their respective channels by the detector 5 or the detector 6. A bistable circuit 12 for CH. A and a bistable circuit 13 for CH. B are actuated when an error is detected by the detector 5 and are reset when an RQ signal is detected by the detector 6.

An *r* character cycle timer 15 counts the pulses from the channel pulse generator 4 and continuously generates pulses with the same period as the repetition cycle, that is, one pulse in each *r* character period. Through the pulses from the *r* character cycle timer 15, a mark pulse counter 14 emits pulses in "proper" output when the number of mark pulses within the *r* character cycle corresponds to the predetermined number. The "proper" output pulses advance the count of a counter 17 of the succeeding stage. However, when the number of mark pulses does not correspond to the predetermined number, pulses of "improper" output pass through an OR gate and reset the counter 17. An error memory 16 comprises, for example, a bistable circuit and is actuated to be set, for example, to condition "1" by pulses sent from the error detector 5 representative of the detection of errors in any channel; and it is reset for example to condition "0" by the pulses from the *r* character cycle timer 15 after the reading out of the state thereof. When there is an output in any one of the bistable circuit 12 (CH. A) or the bistable circuit 13 (CH. B) or the error memory 16, an OR gate 19 inhibits the resetting of the counter 17 through an inhibitor 18 by pulses from the *r* character cycle timer 15 passing through the OR gate 23. When the count of the counter 17 reaches to the full scale thereof, it generates an output to actuate a dephase indicator 10 of the succeeding stage, and the output signal of indicator 10 is imparted to the repetition cycle counters 7 and 8. In this case, the counters 7 and 8 comprise, respectively, a counter having the scale corresponding to the number of aforesaid repetition characters, and count pulses are applied from the channel pulse generator 4 in a cyclic state, whereby counters 7 and 8 generate, respectively, one pulse in each repetition cycle. The output pulses of the counter 7 is imparted to an AND gate 11.

When the output of dephase indicator 10 and the output of counter 7 are imparted to the AND gate 11, the gate 11 generates an output which is applied to the phase shifter 3, whereby the pulses from the timing pulse generator 1 are shifted by one sampling cycle, thereby correcting the phase of the channel pulse generator 4. An error memory 22 comprises, for example, a bistable circuit and is actuated to be set for example to condition "1" by pulses sent from the error detector 5 representative of the detection of errors in any channel. The memory 22 is reset for example to condition "0" by pulses applied from the repetition cycle counter 7 (CH. A) after reading out of the state whereof. When any of the bistable circuit 12 or 13 the error memory 22 is actuated, an OR gate generates an output signal, which, by an inhibitor 20, inhibits the resetting of the dephase indicator 10 carried out by the pulses from the repetition cycle counter 7 (CH. A).

For a more comprehensive understanding of the system of the invention, the operation thereof in the cases of "in phase" and "dephase" is disclosed in the following detailed description.

(I) *The case of normal condition (no error, no dephase)*.—In this case, the error detector 5 does not operate; accordingly, the bistable circuits 12 and 13 and the error memory 16 do not operate. Since there is no output at the OR gate 19, the pulses from the *r* character counter 15 are not inhibited by the inhibitor 18; accordingly, the counter 17 is maintained in its reset state. Therefore, even if the mark pulse counter 14 counts the predetermined number of marks and endeavors to cause the counter 17 to count, the counter 17 will not operate. Accordingly, since the dephase indicator 10 and the AND gate 11 will not produce outputs thereof, the phase shifter 3 will not undergo phase shift operation.

(II) *The case wherein error is caused by noise (including line break)*.—In this case, the error detector 5 operates first. Accordingly, any one or more outputs of the bistable circuit 12 or 13 and of the error memory 16 are produced, therefore the output of the OR gate 19 is generated. Then the reset pulses from the *r* character cycle timer 15 are inhibited by the inhibitor 18. However, if an error is caused by noise, since the mark pulse counter 14 does not ordinarily count the predetermined number of mark or space element pulses within the *r* character cycles, an "improper" output thereof passed through the OR gate 23, reset the counter 17, and, therefore, the counter 17 does not advance the state thereof.

(III) *The case of dephase*.—In this case, since the received signal is detected, in general, as an error, the bistable circuits 12 and 13 and the error memory 16 operates, and then the OR gate 19 generates the output thereof, which inhibits, by the inhibitor 18, the resetting pulses from the *r* character cycle timer 15. On the other hand, when errors are detected in the error detector 5, the ARQ system undergoes the repetition conditions and therefore the received aggregate signal becomes a repetition of the *r* character. Accordingly, when this aggregate signal is checked up, in the mark pulse counter 14, the number of its mark element pulses during the *r* character cycle starting from any optional signal elements, the number thereof will constantly correspond to the predetermined number, whereby a "proper" output will be emitted from the mark pulse counter 14. Accordingly, the OR gate 23 has no output signal and the counter 17 is not reset but begins its count of the "proper" output. When the count of the counter 17 reaches to the full scale *i*, it generates the output which actuates the dephase indicator 10 of the succeeding stage. The dephase indicator 10 maintains its actuated state as long as no reset pulse arrives through the inhibitor 20 and accomplishes phase shift operation through the AND gate 11 and the phase shifter 3.

It so happens that, on rare occasions, that, even the dephase condition occurs, errors are not deteected steadily because of a certain combination of the characters transmitted from the other party and the time position of the displaced phase. However, since the first character just succeeding to the instant of occurrence of the dephase condition is detected as an error in almost all cases, the bistable circuits 12 and 13 actuate. The function of the ARQ system is constructed generally so that the repetition cycle counter 7 or 8 continues its cyclic counting during the actuated state of the bistable circuit 12 or 13 respectively, so that the *r* characters are continuously transmitted from the other party. If the number of mark element pulses in this aggregate signal is counted in each *r* character cycle, the counted number will correspond to the predetermined number. Accordingly, in this case the output of the bistable circuit 12 or 13 passes through the OR gate 19 and inhibits the reset pulse from the *r* character cycle timer 15. A "proper" output is sent out from the mark pulse counter 14, and thereafter, phase shift operation is accomplished by the same process as in the afore-described case.

(IV) *Phase shift and detection of inphase condition*.—When the dephase indicator 10 actuates as was stated in the above-mentioned case, its output forces compulsorily the repetition cycle counters 7 and 8 to start the cyclic counting condition and causes a phase shift through the AND gate 11 and the phase shifter 3, but when inphase condition is attained, it is necessary to stop the phase shift immediately and to cause the whole system to be restored to its original, normal state.

When an error exists within the repetition cycle of CH. A, the error memory 22 operates, and its output passes through the OR gate 21 and is imparted to the inhibitor 20 to inhibit the resetting of the dephase indicator 10 by the pulse from the repetition cycle counter 7. Accordingly, the resetting of the dephase indicator 10 occurs only when the RQ signals are received in both channels, and moreover the error memory 22 does not operate (in this case, the error detector 5 does not detect errors). Then the system is immediately returned to the normal condition.

When an error exists within the repetition cycle of CH. A, the error memory 22 operates, and its output passes through the OR gate 21 and is impressed to the inhibitor 20 to inhibit the resetting of the dephase indicator 10 by the pulse from the repetition cycle counter 7. Accordingly, the resetting of the dephase indicator 10 occurs only when the RQ signals are received in both channels and moreover the error memory 22 does not operate (in this case, the error detector 5 does not detect errors). Then the system is immediatley returned to the normal condition.

As may be understood from the above description, in the system according to the present invention, in the case wherein noise exists, erroneous judgement of the presence of the dephase condition occurs when the existence of error within the $r$ character cycle continues through $i$ cycles, and, at the same time, the ratio of the mark-space numbers in the entire $r$ character cycle is, by chance, coincident with the predetermined value for all $i$ cycles. The probability of this occurrence, however, is extremely low. Accordingly, since even scale $i$ of the counter is made small, misoperation is amply prevented, it is possible to shorten substantially the time actually required for the detection of the case of dephase.

A more specific consideration of the probabilities involved may be represented mathematically as in the following description. If, as a scale expressing the reception condition, the probability of element error is denoted by $P_e$, and it is assumed that errors are generated at random, and that the probabilities of error of the marks and spaces are equal, the probability $P_k$ of reception of characters having the predetermined ratio (correct or undetectable error), in the case of a two-channel, ARQ system wherein a code of 3 marks, 4 spaces is used in CH. A and a code of 4 marks, 3 spaces is used in CH. B, can be given by the following equation:

$$P_k=\sum_{r=0}^{3} {}_3C_r\cdot {}_4C_r\cdot P_e^{2r}(1-P_e)^{7-2r}$$

If the repetition cycle is taken to be a four-character cycle, since the two channels will then have 8 characters, the probability of reception during this interval of only characters having the predetermined ratio is $P_k^8$.

Furthermore, if the number of code elements within one repetition cycle is denoted by N (in this case: $7\times2\times4=56$), the probability $P_n$ of reception of the predetermined number $n$ (in this case: $(3+4)\times4=28$) of marks will be given by the following equation.

$$P_n=\sum_{r=1}^{28} ({}_{28}C_r)^2\cdot P_e^{2r}(1-P_e)^{56-2r}$$

Accordingly, the probability of there being a detectable error within one repetition cycle, and, at the same time, the number of marks becoming $n$ will be according to the following equation.

$$P=P_n-P_k^8$$

In the dephase detector of the system of the present invention, erroneous judgement due to noise of the dephase condition occurs when an output is sent out from the counter (scale of $i$), and the probability $P_i$ of this occurrence is determined by the following equation.

$$P_i=P^i=(P_n-P_k^8)^i$$

The result of calculation by the above equation for the case in which $i=4$ in the counter (scale of $i$) is represented in FIG. 5. As is indicated in this graph, the probability of misoperation is the highest when $P_e$ is approximately 0.06 and is: $P_i=1.2\times10^{-3}$. When this reception condition has continued for some time, the average time up to misoperation in the case of a communication speed of 96 Bauds with a two-channel system is approximately 6 minutes.

While the probability of misoperation is a maximum at the time of random noise, as described above, the errors of the marks and spaces, with an actual circuit, are exclusive, or the condition fluctuates violently with time; therefore, it may be said that there is almost no misoperation of this circuit.

In the case of actual dephase with this circuit, the time required for detecting this diphase is:

$$\frac{1}{96}\times7\times2\times4\times4 \text{ sec.}=2.3 \text{ sec.}$$

In this case, moreover, it is possible to detect dephase in the above-stated time when error is being received, of course, and even when the state of dephase is such that no error exists in the normal manner, so that the detecting ability is increased.

The detection of the inphase state, during phase shift, is accomplished by the detection of RQ signals and no error state during one repetition cycle in all channels. Accordingly, when the inphase state has not yet been established, there is no possibility of misjudging as phase-in, unlike the conventional system wherein the different character may be erroneously interpreted as an RQ signal.

As a result of tests, it has been established that by the use of the present system, the dephase detection time has been reduced to approximately 1/10, and the probability of misoperation due to noise has been reduced to approximately 1/500 relative to the corresponding performances of conventional systems.

Since it is obvious that many changes and modifications can be made in the above-described details without departing from the nature and spirit of the invention, it is to be understood that the invention is not to be limited to the details described herein except as set forth in the appended claims.

We claim:

1. A phase correcting system for a synchronous telegraph system employing a telegraph code having a constant mark-to-space ratio and affording error correction by automatic repetition wherein erroneous characters in a received telegraph signal are detected in order to request automatically the transmitting station to re-transmit correct characters, said phase correcting system comprising, first means for detecting said erroneous characters by examining the mark-to-space ratio during each character period of a received signal, second means connected to the first means for detecting the existence of error detected by said first means in a fixed period which is equal to an integral multiple of the repetition cycle of said synchronous telegraph system, third means for detecting whether the number of mark or space element pulses of the received signal during said fixed period corresponds to a pretermined number, means comprising pulse generating means connected to said first means for generating character timing pulses for testing said received signal, fourth means connected to said second means and said third means for detecting whether phases of signals corresponding to the received characters are in-phase or out-of-phase with said character timing pulses, said fourth means comprising means for detecting only when said second means detects the existence of error during said fixed period and said third means detects that the number of mark or space elements is equal to said predetermined number, and fifth means connected to said fourth means for shifting the phase of the character timing pulses until the phase of said character timing pulses is brought in-phase with the phase of the signals corresponding to the received characters.

2. A phase correcting system for a synchronous telegraph system employing a telegraph code having a constant mark-to-space ratio and affording error correction by repetition wherein erroneous characters in a received telegraph signal are detected in order to request automatically the transmitting station to retransmit correct characters, said phase correcting system comprising first means for detecting the erroneous characters by examining the mark-to-space ratio during each character period of a received signal, second means connected to the first means for detecting the existence of error detected by the first means in a fixed period which is equal to an integral multiple of the repetition cycle of the synchronous telegraph system, third means for detecting whether or not the number of mark or space-element pulses of the received signal during said fixed period corresponds to a predetermined number, means comprising pulse generating means connected to said first means, fourth means connected to said second means, for detecting whether or not the phase of signals corresponding to the received characters are in-phase or out-of-phase with the character timing pulses, fifth means connected to said fourth means for shifting the phase of the character timing pulses until the phase of the character timing pulses is brought in-phase with the phase of the signals corresponding to the received character, sixth means for detecting an RQ signal comprising a repetition signal on said telegraph system and indicating that a repetition is about to start, and seventh means connected to said first, sixth and fourth means for detecting erroneous characters and operative when an error character is detected by the first means and restorable to a normal state when the RQ signal is detected by said second means, connections connecting said fourth means to said third means and seventh means and said fourth means operating when the first character just succeeding an instant of occurrence of an out-of-phase condition is detected as an erroneous character by said seventh means and the third means detects that the number of mark or space-element pulses during each said fixed period corresponds to said predetermined number.

3. A phase correcting system for a synchronous telegraph system employing a telegraph code having a constant mark-to-space ratio and affording error correction by repetition wherein erroneous characters in a received telegraph signal are detected in order to request automatically the transmitting station to retransmit correct characters, said phase correcting system comprising first means for detecting the erroneous characters by examining the mark-to-phase ratio during each character period of a received signal, second means connected to the first means for detecting the existence of error detected by the first means in a fixed period which is equal to an integral multiple of the repetition cycle of the synchronous telegraph system, third means for detecting whether or not the number of mark or space element-pulses of the received signal during said fixed period corresponds to a predetermined number, means comprising pulse generating means connected to said first means, fourth means connected to said second means and said third means for detecting whether or not the phase of signals corresponding to the received characters are in-phase or out-of-phase with the character timing pulses, fifth means connected to said fourth means for shifting the phase of the character timing pulses until the phase of the character timing pulses is brought in-phase with the phase of the signals corresponding to the received character, sixth means connected to said fourth means for detecting an RQ signal comprising a repetition signal which is transmitted on said telegraph system and indicating that a repetition is about to start, and seventh means for detecting whether or not any error exists or not in the repetition cycle of the synchronous telegraph system, means comprising said fourth means connected to said sixth means and said seventh means for stopping phase shifting of said fifth means when said sixth means detects the existence of an RQ signal and the seventh means does not detect any erroneous character during a repetition cycle.

References Cited by the Examiner

UNITED STATES PATENTS

| | | | |
|---|---|---|---|
| 2,918,526 | 12/59 | Wright | 178—23 |
| 2,954,433 | 9/60 | Lewis et al. | 178—23 |
| 2,997,540 | 8/61 | Ertman et al. | 178—23 |

MALCOLM A. MORRISON, *Primary Examiner.*

NEWTON N. LOVEWELL, *Examiner.*